United States Patent [19]
Alaze

[11] Patent Number: 6,146,115
[45] Date of Patent: Nov. 14, 2000

[54] PISTON PUMP

[75] Inventor: Norbert Alaze, Markgroningen, Germany

[73] Assignee: Robert Bosch GmbH, Stuttgart, Germany

[21] Appl. No.: 09/331,937

[22] PCT Filed: Jul. 30, 1998

[86] PCT No.: PCT/DE98/02173

§ 371 Date: Jul. 28, 1999

§ 102(e) Date: Jul. 28, 1999

[87] PCT Pub. No.: WO99/23387

PCT Pub. Date: May 14, 1999

[30] Foreign Application Priority Data

Oct. 30, 1997 [DE] Germany .................. 197 47 852

[51] Int. Cl.$^7$ .............. F04B 39/10; F04B 7/00; F04B 7/04; F04B 17/00

[52] U.S. Cl. .............. 417/549; 417/514; 417/495; 417/415; 417/569

[58] Field of Search .................. 417/549, 514, 417/495, 487, 469, 415, 214, 569, 562, 554, 552; 92/249, 253, 255, 259

[56] References Cited

U.S. PATENT DOCUMENTS

| | | | |
|---|---|---|---|
| 5,123,819 | 6/1992 | Schuller et al. .......... | 417/569 |
| 5,232,273 | 8/1993 | Eckstein et al. .......... | 417/569 |
| 5,320,498 | 6/1994 | Fuchida ................ | 417/214 |
| 5,588,817 | 12/1996 | Zirps et al. ............. | 417/549 |
| 5,688,113 | 11/1997 | Bareiss et al. .......... | 417/549 |
| 5,746,111 | 5/1998 | Mueller et al. .......... | 92/168 |

*Primary Examiner*—Charles G. Freay
*Assistant Examiner*—Michael K. Gray
*Attorney, Agent, or Firm*—Ronald E. Greigg; Edwin E. Greigg

[57] ABSTRACT

A piston pump which is intended particularly for use in a slip-controlled hydraulic vehicle brake system. To increase a pumping volume of the piston pump at low pumping pressure, the piston pump includes a body embodied preferably as an annular body which is attached axially displaceably to the piston. The body increases a cross- sectional area of the piston and is axially acted upon by a spring element. At low pressure, the piston pump pumps with the entire cross-sectional area of the piston and the body while conversely at a higher pumping pressure, the body is held back counter to the force of the spring element and does not move together with the piston so that then the piston pumps only with its own cross-sectional area. The piston pump of the invention has the advantage of improved pressure buildup dynamics when the pumping pressure at the onset of pumping is low.

28 Claims, 2 Drawing Sheets

PISTON PUMP

This application is a 371 of PCT/DE98/02173 filed Jul. 30, 1998.

PRIOR ART

The invention relates to a piston pump which is intended in particular for use as a pump for a hydraulic vehicle brake system.

One such piston pump is known for instance from German Patent Disclosure DE 41 07979 A1. The known piston pump has a piston which is received axially displaceably in a pump housing and can be driven to execute a reciprocating stroke motion in the axial direction by means of an eccentric element that can be driven to rotate by an electric motor.

ADVANTAGES OF THE INVENTION

The piston pump of the invention has, in addition to the piston, a body that just like the piston is received axially displaceably in the pump housing. The body is furthermore axially displaceable relative to the piston counter to the force of a spring element which is supported on the piston. The piston can not only move together with the body axially in the pump housing, but can also move axially in the pump housing and relative to the body when the body is in repose in the pump housing. It is also possible for the piston and the body to move at different speeds and for different distances in the pump housing. The body increases a cross-sectional area of the piston. If the body in a stroke motion moves with the piston, the pumping volume per piston stroke of the piston pump of the invention increases in accordance with the cross-sectional area of the body. When the body is in repose in the pump housing, the pumping volume per piston stroke is correspondingly less. The body moves together with the piston whenever a force which a fluid pumped by the piston pump exerts on the body by reason of its pressure is no greater than the force of the spring element which is braced on the piston and presses axially against the body. Conversely, if the pressure of the pumped fluid is so high that the force exerted on the body by the fluid exceeds the force of the spring element, braced on the piston, at maximum force of the spring element, then the body does not move in the pump housing. If the pressure of the pumped fluid is between these two pressures, then the body moves by a shorter axial distance than the piston, and a fluid quantity is pumped that is greater than the pumped fluid quantity when only the piston moves and is less than the fluid quantity when the body moves together with the piston.

The piston pump of the invention has the advantage that at low pumping pressure, it pumps an increased fluid volume per piston stroke. Since a drive motor of the piston pump is designed for high pressure, the drive motor is not overloaded by the increased pumping quantity at low pressure. If the piston pump is pumping at high pressure, its pumping volume per piston stroke is reduced. As a result, the force required to drive the piston is reduced at the same time. The piston pump of the invention thus has the advantage of a pumping volume that is dependent on the pumping pressure. When the piston pump of the invention is used in a hydraulic vehicle brake system, this has the advantage of improved pressure buildup dynamics: For instance, if in order to initiate braking, pressure first has to be built up in wheel brake cylinders, then the piston pump of the invention, without changing its drive, pumps an increased volumetric flow and thus assures a rapid pressure buildup. When a high final pressure is reached, or for instance in slip control if after a limited pressure reduction in a wheel brake cylinder the pressure has to be increased again, then the pumping volume of the piston pump of the invention is reduced, so that with a predetermined axial force on the piston, the pump pressure is increased.

In a preferred feature of the invention, the body is embodied as an annular body which is axially displaceable in the manner of a sliding sleeve on the piston and is also axially displaceable in the pump housing. Because the body is embodied as an annular body, the invention can be realized in a simple way.

In particular, in one feature of the invention, a sealing and/or guide ring that is necessary anyway is employed as the annular body that is jointly moveable with the piston.

This feature of the invention has the advantage of not requiring any additional body.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

DRAWING

The invention will be described in further detail below in terms of an exemplary embodiment shown in the drawing.

DESCRIPTION OF THE EXEMPLARY EMBODIMENTS

Figure 1:
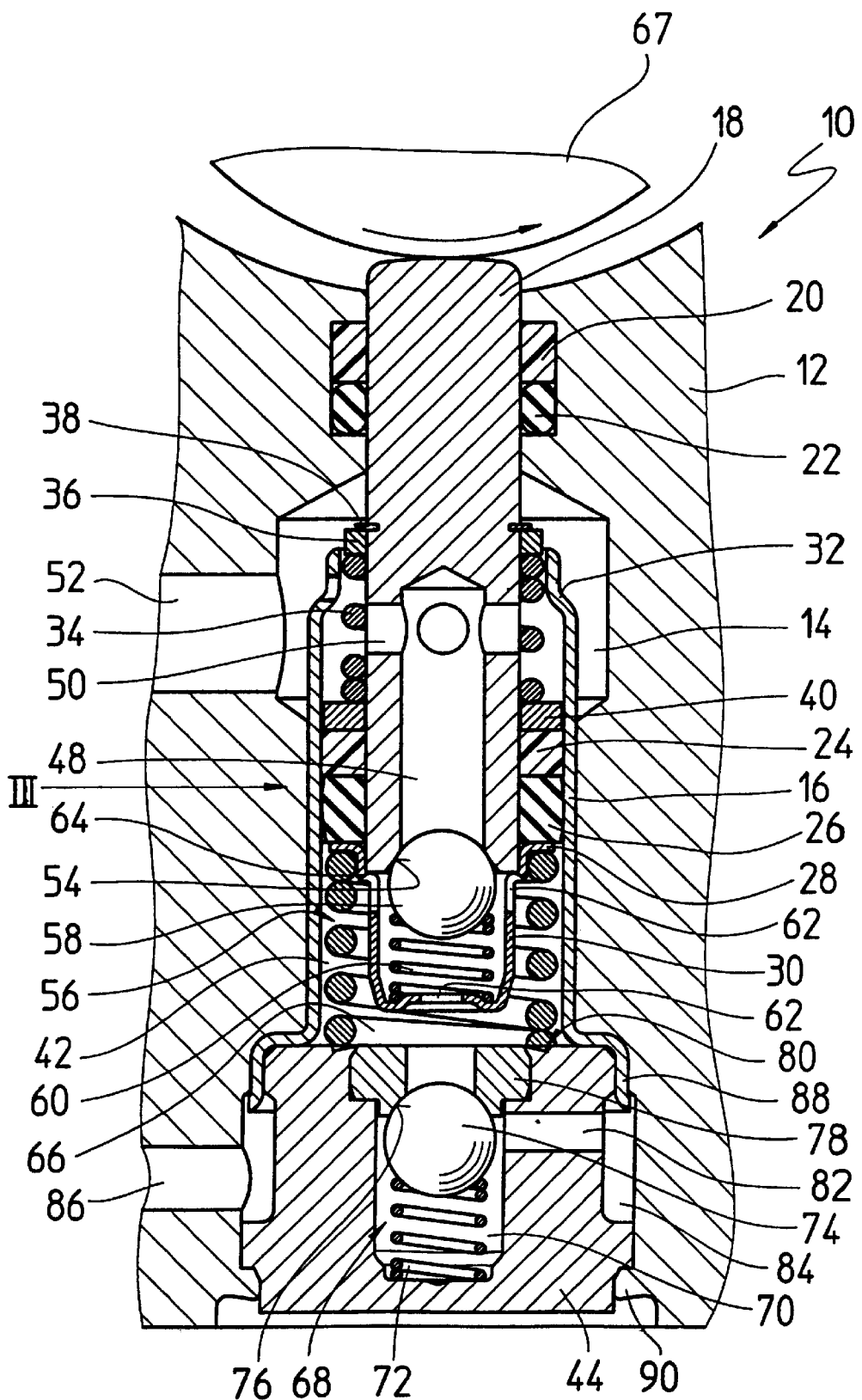
FIG. 1 shows an axial section through a piston pump of the invention.

The piston pump 10 of the invention, shown in FIG. 1, is inserted into a hydraulic block 12, of which the drawing shows only a fragment surrounding the piston pump 10. Other hydraulic components, not shown, such as magnet valves, hydraulic reservoirs and dampers of a slip-controlled vehicle brake system, are inserted into the hydraulic block 12 and are hydraulically connected to one another and to the piston pump 10 by the hydraulic block 12. The hydraulic block 12 forms a pump housing of the piston pump 10 of the invention and will hereinafter be called the pump housing 12.

A tubular bush 16 is press-fitted into a stepped continuous bore 14 in the pump housing 12. A pin-like piston 18 is received axially displaceably in the bush 16. The piston 18 protrudes for a portion of its length from the bush 16. On its end protruding from the bush 16, the piston 18 is guided axially displaceably in the pump housing 12 by a guide ring 20 and is sealed off in the pump housing 12 by a sealing ring 22. The guide ring 20 and the sealing ring 22 are inserted jointly into a groove that is made in the bore 14 in the pump housing 12.

One end of the piston 18, located in the bush 16, is axially displaceably guided in the bush 16 by means of a guide ring 24 and is sealed off in the bush 16 by means of a sealing ring 26; both rings are slipped onto the piston 18. The guide ring 24 and the sealing ring 26 are axially displaceable both in the bush 16 and on the piston 18. The displacement travel in one direction is limited by a radial flange 28 of a valve cage 30, which is mounted on the face end of the piston 18 that is located in the bush 16, and whose radial flange 28 protrudes radially outward from a circumference of the piston 18. The radial flange 28 forms an axial stop of the piston 18 for the guide ring 24 and the sealing ring 26.

In the opposite direction, the displacement travel of the guide ring 24 and sealing ring 26 in the bush 16 is limited by an annular shoulder 32, which reduces a diameter of the bush 16 on the face end from which the piston 18 protrudes for part of its length. The annular shoulder 32 forms an axial stop of the bush 16 for the guide ring 24 and the sealing ring 26 which are axially displaceable in the bush 16 and on the piston 18.

The guide ring 24 and the sealing ring 26 are pressed by a helical compression spring 34, which is slipped onto the piston 18, against the radial flange 28 of the valve cage 30 forming the axial stop of the piston 18. The helical compression spring 34 is supported on the piston 18 via a shim ring 36 and a snap ring 38, which is inserted into a piston groove. A support ring 40 is placed between the helical compression spring 34 and the guide ring 24. The helical compression spring 34 presses the guide ring 24 and the sealing ring 26 with initial tension against the radial flange 28, on the piston 18.

The guide ring 24 and sealing ring 26 form a body which is axially displaceable both in the bush 16 and on the piston 18; the guide ring 24 and sealing ring 26 will therefore be referred to hereinafter as the body 24, 26. The body 24, 26 increases a cross-sectional area of the piston 18. The support ring 40 can also be considered as a component of this body.

The piston pump 10 of the invention has a positive displacement chamber 42 inside the bush 16, which is defined by the piston 18, with the body 24, 26 axially displaceable on the piston, and by a closure plug 44, which is inserted into a face end of the bush remote from the annular shoulder 32.

The body 24, 26 that is axially displaceable on the piston 18 has the following function: If a pressure that exerts a force on the body 24, 26 and that is less than the prestressing force of the helical compression spring 34 prevails in the positive displacement chamber 42, then the helical compression spring 34 keeps the body 24, 26 in contact with the radial flange 28; that is, the piston 24, 26 moves together with the piston 18. This means that upon a pumping stroke of its piston 18, in which the piston 18 moves into the bush 16, the piston pump 10 of the invention positively displaces a fluid volume (pumping volume) out of the positive displacement chamber 42 that is equivalent to the product of the travel of the piston 18 in the pumping stroke (piston stroke) and an internal cross-sectional area of the bush 16. That is, a large volumetric flow is pumped.

Conversely, if a pressure that keeps the body 24, 26 on the annular shoulder 32 of the bush 16 counter to the force of the helical compression spring 34 prevails in the positive displacement chamber, then the piston 18 in its pumping stroke positively displaces a volume from the positive displacement chamber 42 that is equivalent only to the product of the piston stroke and the cross-sectional area of the piston 18, which is less than the internal cross-sectional area of the bush 16 by the area of, an annular end face of the body 24, 26 located between the piston 18 and the bush 16. If the pressure in the positive displacement chamber 42 is between the two pressures described, then the body 24, 26 is displaced in the bush 16 by a shorter distance than the piston stroke of the piston 18, and correspondingly the pumping volume is between the two cases described. Thus, at a low pumping pressure, the piston pump of the invention has an increased pumping volume.

Figure 2:
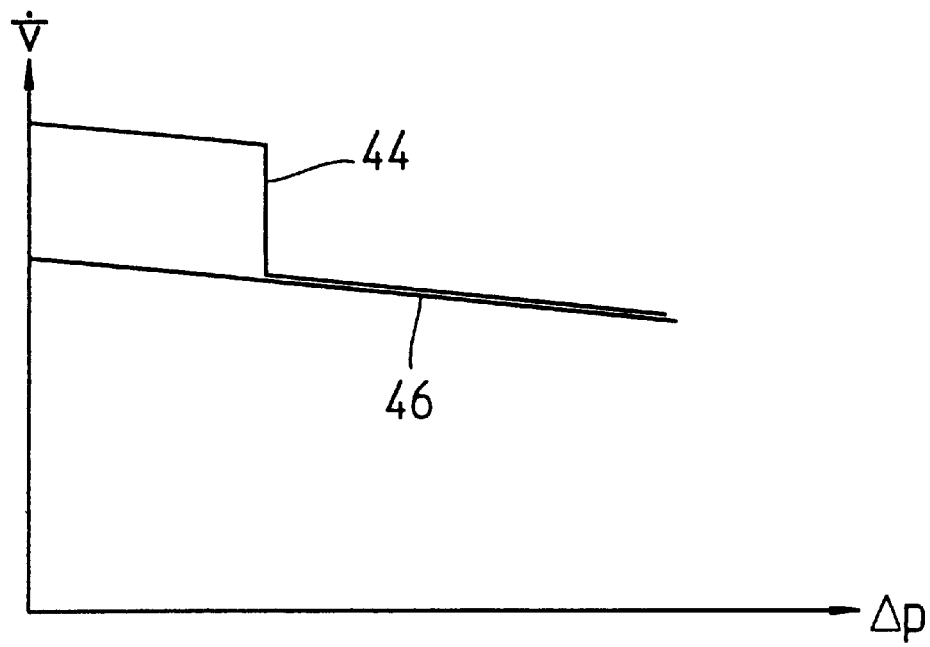
FIG. 2 shows a schematic pumping characteristic curve graph.

A pumping characteristic curve of the piston pump 10 of the invention is shown schematically, compared with a pumping characteristic curve of a conventional piston pump, in the graph in FIG. 2. A mean pumping volume flow is plotted on the ordinate, and the pumping pressure, that is, the pressure difference between the pump inlet and the pump outlet, is plotted on the abscissa. The upper pumping characteristic curve 44 pertains to the piston pump 10 of the invention, while the lower pumping characteristic curve 46 pertains to a conventional piston pump. The increased pumping volume flow of the piston pump 10 of the invention at low pumping pressure is clearly shown.

The prestressing force of the helical compression spring 34 is equivalent to a pressure of approximately 20 to 30 bar in the positive displacement chamber 42 of the piston pump 10. In FIG. 1, the terminal position of the piston at the end of the pumping stroke is shown, that is, when the piston 18 has been thrust the farthest inward into the bush 16.

For fluid admission into the piston pump 10 of the invention, the piston 18 has an axial blind bore 48, which is intersected by transverse bores 50. The fluid admission is effected through an inlet bore 52 in the pump housing 12, which discharges radially into the stepped bore 14, and from there on into the end, remote from the positive displacement chamber 42, of the bush 15, and into the transverse bores 50 and the blind bore 48 of the piston 18. The blind bore 48 discharges with a conical valve seat 54 into the positive displacement chamber 42. The valve seat 54, like the valve cage 30, is part of an inlet valve 56 of the piston pump 10 embodied as a spring-loaded check valve 56. This inlet valve 56 has a valve ball 58 as the valve closing body, which is pressed against the valve seat 54 by a helical compression spring 60 acting as a valve closing spring. The valve closing spring 60 and the valve ball 58 are received in the valve cage 30. The valve cage 30 is a cup-shaped deep-drawn sheet-metal part with flow openings 62 on its circumference and its bottom. The valve cage 30 has an annular shoulder 64 on its open side, with which it rests on the face end, located in the bush 16, of the piston 18. It is held in contact with the piston 18 by a piston restoring spring 66 embodied as a helical compression spring, which is inserted into the positive displacement chamber 42, is braced against the closure plug 44, and presses against the radial flange 28 of the valve cage 30. The piston restoring spring 66 presses the piston 18 against a circumference of an eccentric element 67, which can be driven by an electric motor and serves in a manner known per se to drive the piston 18 to execute its reciprocating motion.

As its outlet valve 68, the piston pump 10 also has a spring-loaded check valve, which is accommodated in the closure plug 44. The closure plug 44 has an axial blind bore 70, which is opened toward the positive displacement chamber 42 and into which a helical compression spring acting as a valve closing spring 72 is inserted; this spring presses a valve ball 74, received in the blind bore 70 and acting as a valve closing body against a conical valve seat 76 of the outlet valve 68. The valve seat 76 is mounted on a circular-annular valve seat body 78, which is inserted from a face end toward the positive displacement chamber 42 into the closure plug 44 and is held by a caulk 80.

Fluid emission is effected through a radial bore 82 in the closure plug 44, via an annular conduit 84 surrounding the closure plug 44, into a radial outlet bore 86 in the pump housing 12.

The closure plug 44 is press-fitted in fluid-type fashion into an annular shoulder-shaped enlargement 88 of the bush 16. The closure plug 44 is held in the pump housing 12 by a calk 90 of the pump housing 12 and closes the stepped bore 14 in the pump housing 12 in pressure-type fashion.

The piston pump 10 shown can also be modified as needed in such a way that the helical compression spring 34 is braced not on the piston 18 but rather on the pump housing 12, for instance in the region of the guide and sealing ring 20, 22. In this modification, not shown, the shim ring 36 and snap ring 48 can be dispensed with. However, it is a certain disadvantage of this modification that the helical compression spring 34 must be designed for a longer stroke, in comparison with the version shown in the drawing.

Figure 3:
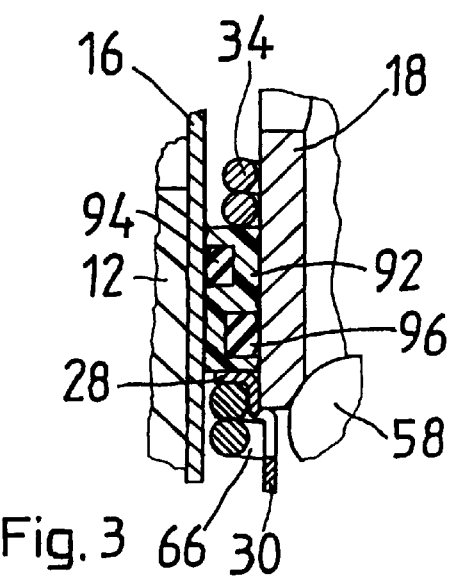
FIG. 3 shows a detail of a modified embodiment of the piston pump of the invention indicated by the arrow III in FIG. 1.

The modification, shown only as a detail in FIG. 3, of the piston pump shown in FIG. 1 has an annular body 92 of S-shaped annular cross section, in the form of a body that is axially displaceable in the pump housing 12 and relative to the piston 18. The annular body 92 comprises a dimensionally stable plastic that slides easily and guides well, such as the same material as the guide ring 24 of the piston pump 10 shown in FIG. 1. The annular body 92 is slipped axially displaceably onto the piston 18; it rests in an annular interstice between the piston 18 and the bush 16. The annular body 92, viewed in the axial direction, is located between the helical compression spring 34 and the radial flange of the valve cage 30; the annular body 92—like the guide ring 24 and sealing ring 26 in the piston pump shown in FIG. 1—is pressed against the radial flange 28 by the helical compression spring 34 which is under initial tension and if there is a sufficient pressure difference between the positive displacement chamber and an inlet side of the piston pump, it is lifted from the radial flange 28 counter to the force of the helical compression spring 34.

Two sealing rings 94, 96, are located in two encompassing grooves of the annular body 92 that are formed by the S-shaped annular cross section of the annular body 92, one of the grooves opening outward and the other opening inward; of these sealing rings, the sealing ring 94 provides sealing between the annular body 92 and the bush 16, and the other sealing ring 96 provides sealing between the annular body 92 and the piston 18. Using the dimensionally stable annular body 92 has the advantage that the annular body 92 absorbs the axial force exerted by the helical compression spring 34; the sealing rings 94, 96 resting in the annular body 92 are not acted upon by the force of the helical compression spring 34. This improves the durability of the sealing rings 94, 96, reduces their friction, and improves their sealing action. The dimensionally stable annular body 92 brings about optimal installation conditions for the sealing rings 94, 96. The annular body 92 guides the piston 18 axially in the bush 16, so that no separate guide ring is necessary. Together with the sealing rings 94, 96, the annular body 92 provides sealing between the piston and the bush 16, so that the sealing ring 26 of the piston pump 10 shown in FIG. 1 is omitted. The support ring 40 of the piston pump shown in FIG. 1 is equally unnecessary.

Otherwise, the detail in FIG. 3 showing a modification according to the invention of the piston pump 10 shown in FIG. 1 agrees with that piston pump 10 and functions in the same way. The same reference numerals are used for components that match. To avoid repetition, in this respect see the above descriptions of FIGS. 1 and 2.

The foregoing relates to the preferred exemplary embodiments of the invention, it being understood that other variants and embodiments thereof are possible within the spirit and scope of the invention, the latter being defined by the appended claims.

What is claimed is:

1. A piston pump for a vehicle brake system, comprising:
 a pump housing (12) and a piston (18) that is driven to execute a reciprocating stroke motion and is received axially displaceably in a bore (14) in the pump housing (12);
 a fluid inlet (52) and a positive displacement chamber (42) formed in the pump housing;
 a body (24, 26, 40; 92 94, 96), having at least a first portion and a second portion, axially displaceably received in the pump housing (12), the first portion being positioned closer to the positive displacement chamber (42) than the second portion, wherein the body (24, 26, 40, 92, 94 96) is axially displaceable relative to the piston (18) and reacts to a force of a spring element (34), the body increasing a cross sectional area of the piston (18), and
 wherein the fluid inlet (52) is positioned closer to the second portion of the body than to the first portion of the body (24, 26, 40; 92, 94, 96), and discharges into the bore (14);
 and a fluid opening (48, 50) is provided in the piston and connects the fluid inlet (52) to the positive displacement chamber (42).

2. The piston pump according to claim 1, in which a check valve (56) is provided in the fluid opening (48, 50) to open and close access to the displacement chamber.

3. The piston pump according to claim 2, in which the check valve (56) in the fluid opening (48, 50) allows a fluid flow only from the fluid inlet (52) to the positive displacement chamber (42).

4. The piston pump according to claim 1, in which the spring element (34) is supported on the piston (18).

5. The piston pump according to claim 2, in which the spring element (34) is supported on the piston (18).

6. The piston pump according to claim 3, in which the spring element (34) is supported on the piston (18).

7. The piston pump according to claim 1, in which the body is an annular body (24, 26, 40; 92, 94, 96) slipped onto the piston 18.

8. The piston pump according to claim 2, in which the body is an annular body (24, 26, 40; 92, 94, 96) slipped onto the piston 18.

9. The piston pump according to claim 3, in which the body is an annular body (24, 26, 40; 92, 94, 96) slipped onto the piston 18.

10. The piston pump according to claim 4, in which the body is an annular body (24, 26, 40; 92, 94, 96) slipped onto the piston 18.

11. The piston pump according to claim 7, in which the annular body has a sealing ring (26, 94, 96).

12. The piston pump according to claim 8, in which the annular body has a sealing ring (26, 94, 96).

13. The piston pump according to claim 9, in which the annular body has a sealing ring (26, 94, 96).

14. The piston pump according to claim 10, in which the annular body has a sealing ring (26, 94, 96).

15. The piston pump according to claim 7, in which the annular body has a guide ring (24, 92).

16. The piston pump according to claim 11, in which the annular body has a guide ring (24, 92).

17. The piston pump according to claim 1, in which the spring element (34), against whose force the body (24, 26, 40; 92, 94, 96) is axially displaceable relative to the piston (18), has an initial tension.

18. The piston pump according to claim 2, in which the spring element (34), against whose force the body (24, 26, 40; 92, 94, 96) is axially displaceable relative to the piston (18), has an initial tension.

19. The piston pump according to claim 3, in which the spring element (34), against whose force the body (24, 26, 40; 92, 94, 96) is axially displaceable relative to the piston (18), has an initial tension.

20. The piston pump according to claim 4, in which the spring element (34), against whose force the body (24, 26, 40; 92, 94, 96) is axially displaceable relative to the piston (18), has an initial tension.

21. The piston pump according to one claim 1, in which the piston pump (10) has an axial stop (32), which is stationary with the pump housing (12), for the body (24, 26, 40; 92, 94, 96), and the axial stop (32) limits an axial motion of the body (24, 26, 40; 92, 94, 96) relative to the pump housing 12 in a direction that tenses the spring element (34) that acts on the body (24, 26, 40; 92, 94, 96).

22. The piston pump according to one claim 2, in which the piston pump (10) has an axial stop (32), which is stationary with the pump housing (12), for the body (24, 26, 40; 92, 94, 96), and the axial stop (32) limits an axial motion of the body (24, 26, 40; 92, 94, 96) relative to the pump housing 12 in a direction that tenses the spring element (34) that acts on the body (24, 26, 40; 92, 94, 96).

23. The piston pump according to one claim 3, in which the piston pump (10) has an axial stop (32), which is stationary with the pump housing (12), for the body (24, 26, 40; 92, 94, 96), and the axial stop (32) limits an axial motion of the body (24, 26, 40; 92, 94, 96) relative to the pump housing 12 in a direction that tenses the spring element (34) that acts on the body (24, 26, 40; 92, 94, 96).

24. The piston pump according to one claim 4, in which the piston pump (10) has an axial stop (32), which is stationary with the pump housing (12), for the body (24, 26, 40; 92, 94, 96), and the axial stop (32) limits an axial motion of the body (24, 26, 40; 92, 94, 96) relative to the pump housing 12 in a direction that tenses the spring element (34) that acts on the body (24, 26, 40; 92, 94, 96).

25. The piston pump according to claim 1, in which the piston (18) has an axial stop (28), which limits an axial displacement travel of the body (24, 26, 40; 92, 94, 96) relative to the piston (18) in a direction in which the spring element (34) that acts on the body (24, 26, 40; 92, 94, 96) is relieved.

26. The piston pump according to claim 2, in which the piston (18) has an axial stop (28), which limits an axial displacement travel of the body (24, 26, 40; 92, 94, 96) relative to the piston (18) in a direction in which the spring element (34) that acts on the body (24, 26, 40; 92, 94, 96) is relieved.

27. The piston pump according to claim 3, in which the piston (18) has an axial stop (28), which limits an axial displacement travel of the body (24, 26, 40; 92, 94, 96) relative to the piston (18) in a direction in which the spring element (34) that acts on the body (24, 26, 40; 92, 94, 96) is relieved.

28. The piston pump according to claim 4, in which the piston (18) has an axial stop (28), which limits an axial displacement travel of the body (24, 26, 40; 92, 94, 96) relative to the piston (18) in a direction in which the spring element (34) that acts on the body (24, 26, 40; 92, 94, 96) is relieved.

* * * * *